United States Patent [19]
Lehmann et al.

[11] Patent Number: 5,760,194
[45] Date of Patent: Jun. 2, 1998

[54] MONOAZOTRIAZIAYL GROUP-CONTAINING FIBER REACTIVE DYES, PROCESSES FOR THEIR PREPARATION AND THEIR USE

[75] Inventors: Urs Lehmann, Basel; Marcel Frick, Reinach, both of Switzerland

[73] Assignee: Ciba Specialty Chemicals Corporation, Tarrytown, N.Y.

[21] Appl. No.: 752,293

[22] Filed: Nov. 19, 1996

[51] Int. Cl.⁶ .................. C09B 62/473; C09B 62/51; D06P 1/38
[52] U.S. Cl. .................. 534/636; 534/617; 534/618; 534/635; 534/637; 534/638
[58] Field of Search .................. 534/617, 618, 534/638

[56] References Cited

U.S. PATENT DOCUMENTS

| | | | |
|---|---|---|---|
| 4,191,687 | 3/1980 | Austin | 260/153 |
| 4,378,313 | 3/1983 | Kayane et al. | 260/153 |
| 4,754,023 | 6/1988 | Tzikas et al. | 534/618 |
| 4,786,721 | 11/1988 | Tzikas et al. | 534/617 |
| 4,801,694 | 1/1989 | Scheibli et al. | 534/637 |
| 4,851,011 | 7/1989 | Lacroix et al. | 8/527 |
| 5,298,607 | 3/1994 | Seiler | 534/638 |
| 5,541,301 | 7/1996 | Jordine et al. | 534/635 |

FOREIGN PATENT DOCUMENTS

| | | |
|---|---|---|
| 0031099 | 7/1981 | European Pat. Off. |
| 0056975 | 8/1982 | European Pat. Off. |
| 0070806 | 1/1983 | European Pat. Off. |
| 0071985 | 2/1983 | European Pat. Off. |
| 0074928 | 3/1983 | European Pat. Off. |
| 0085025 | 8/1983 | European Pat. Off. |
| 0127456 | 12/1984 | European Pat. Off. |
| 0657508 | 6/1995 | European Pat. Off. |
| 2522672 | 9/1983 | France. |
| 50-157422 | 12/1975 | Japan. |
| 53-46328 | 4/1978 | Japan. |
| 53-46329 | 4/1978 | Japan. |
| 56-118974 | 9/1981 | Japan. |
| 57-49663 | 3/1982 | Japan. |
| 57-199877 | 12/1982 | Japan. |
| 59-174649 | 10/1984 | Japan. |
| 60-47071 | 3/1985 | Japan. |
| 62-164765 | 7/1987 | Japan. |
| 1372527 | 10/1974 | United Kingdom. |
| 2034343 | 6/1980 | United Kingdom. |
| 1576237 | 10/1980 | United Kingdom. |

OTHER PUBLICATIONS

Chem. Abst 84:123403a of JP-A-50/157, 422 (1975).
Chem. Abst. 89: 1123725 of JP-A-53/46, 328 (1978).
Chem. Abst. 89: 112371r of JP-1-53/46, 329 (1978).
Chem. Abst. 96: 36799p of JP-A-56/118, 974 (1981).
Chem. Abst. 97: 57111u of JP-A-57/49, 663 (1982).
Chem. Abst. 98: 217159s of JP-A-57/199, 877 (1982).
Chem. Abst. 102:63580j of JP-A-59/174, 649 (1984).
Chem. Abst. 102: 222146r of JP-A-6047 D71 (1985).
Chem. Abst. 107: 219139p of JP-A-62.164, 765 (1987).

Primary Examiner—Floyd D. Higel
Attorney, Agent, or Firm—David R. Crichton

[57] ABSTRACT

Reactive dyes of the formula

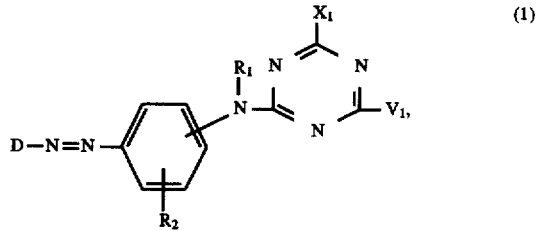

in which

D is a radical of the formula

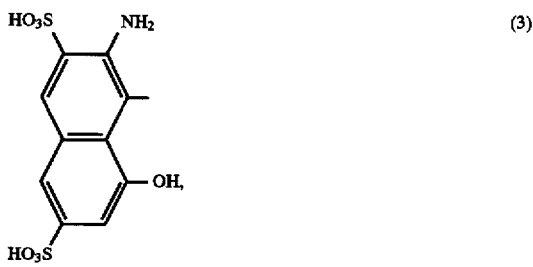

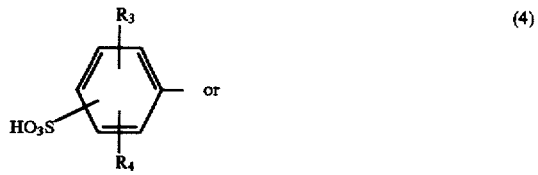

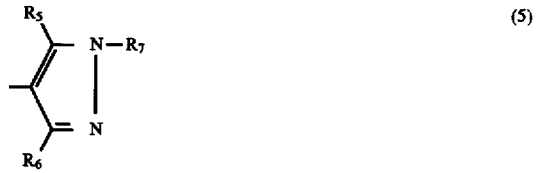

are particularly suitable for dyeing or printing natural or synthetic polyamide fibre materials.

18 Claims, No Drawings

MONOAZOTRIAZIAYL GROUP-CONTAINING FIBER REACTIVE DYES, PROCESSES FOR THEIR PREPARATION AND THEIR USE

The present invention relates to novel reactive dyes, processes for their preparation and their use for dyeing or printing fibre materials.

The practice of dyeing with reactive dyes has recently led to increased requirements regarding the quality of the dyeings and the profitability of the dyeing process. Consequently, there continues to be a demand for novel reactive dyes which have improved properties, in particular in respect of application.

Reactive dyes which have a high degree of exhaustion and high degree of fixing, where, in particular, no alkaline after-treatment is necessary for removing non-fixed dye are now required for dyeing. They should furthermore have a good tinctorial yield and high reactivity. These requirements are not met in all properties by the known dyes.

The present invention is therefore based on the object of discovering novel, improved reactive dyes for dyeing and printing fibre materials, which have the qualities characterized above to a high degree. In particular, the novel dyes should be distinguished by high degrees of exhaustion, high fixing yields and high fibre-dye bond stabilities. They should furthermore produce dyeings with good allround properties, for example light and wet fastness properties.

It has been found that the object described is largely achieved with the reactive dyes defined below.

The invention therefore relates to reactive dyes of the formula

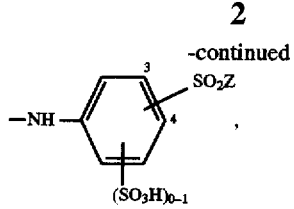

(1)

in which $R_1$ is hydrogen or substituted or unsubstituted $C_1$-$C_4$alkyl, $R_2$ is hydrogen, $C_1$-$C_4$alkyl, $C_1$-$C_4$alkoxy, $C_2$-$C_4$alkanoylamino, ureido, halogen or sulfo, $X_1$ is fluorine or chlorine, $V_1$ is a radical of the formula

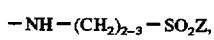 (2a)

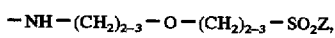 (2b)

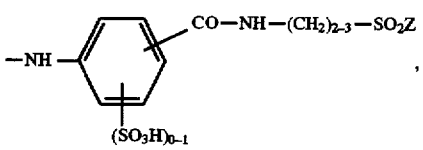 (2c)

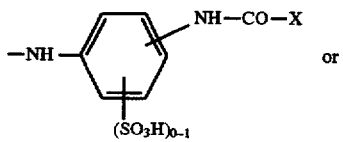 (2d)

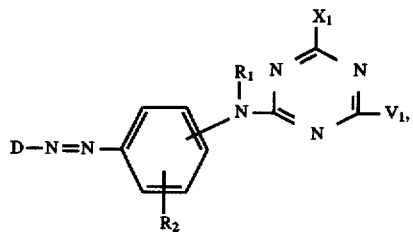 (2e)

in which

Z is the radical —CH=CH$_2$ or —CH$_2$—CH$_2$—Y and

Y is a leaving group,

X is the radical

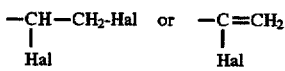

and

Hal is halogen, and the radical —SO$_2$Z in formula (2e) is bonded in the 3- or 4-position shown, and D is a radical of the formula

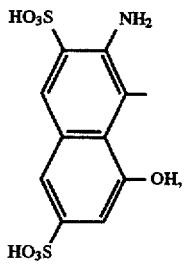 (3)

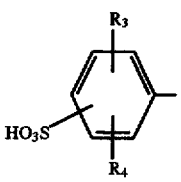 (4)

in which $R_3$ and $R_4$ independently of one another are hydrogen, $C_1$-$C_4$alkyl, $C_1$-$C_4$alkoxy, $C_2$-$C_4$alkanoylamino, ureido or halogen, or

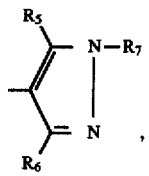 (5)

in which $R_5$ is hydroxyl or amino, $R_6$ is methyl or carboxyl and $R_7$ is hydrogen or phenyl which is unsubstituted or substituted by $C_1$-$C_4$alkyl, $C_1$-$C_4$alkoxy, $C_2$-$C_4$alkanoylamino, ureido, halogen, sulfo, β-hydroxyethylsulfonyl or a radical of the formula —SO$_2$Z, in which Z is as defined above, with the proviso that, if $V_1$ is a radical of the formula (2a) or (2e) and D is a radical of the formula (3), $R_2$ is not sulfo, and if $V_1$ is a radical of the formula (2a), (2b), (2c) or (2e) and D is a radical of the formula (5), $R_7$ is hydrogen or phenyl, and if $V_1$ is a radical of the formula (2d) and D is a radical of the formula (5), the reactive dye of the formula (1) contains not more than two sulfo groups.

$C_1-C_4$alkyl radicals $R_1$ are, for example, methyl, ethyl, propyl, isopropyl, butyl, sec-butyl, tert-butyl or isobutyl. The alkyl radicals mentioned can be unsubstituted or substituted, for example by hydroxyl, sulfo or sulfato.

Preferably, $R_1$ is hydrogen or $C_1-C_4$alkyl which is unsubstituted or substituted by hydroxyl, sulfo or sulfato, in particular hydrogen or $C_1-C_4$alkyl, and preferably hydrogen.

$C_1-C_4$alkyl $R_2$, $R_3$ and $R_4$ and a possible substituent of the radical $R_7$ is, for example, methyl, ethyl, propyl, isopropyl, butyl, sec-butyl, tert-butyl or isobutyl, in particular methyl.

$C_1-C_4$alkoxy $R_2$, $R_3$ and $R_4$ and a possible substituent of the radical $R_7$ is, for example, methoxy, ethoxy, propoxy, isopropoxy, butoxy or isobutoxy, in particular methoxy.

Halogen $R_2$, $R_3$ and $R_4$ and a possible substituent of the radical $R_7$ is fluorine, chlorine or bromine, in particular chlorine.

$C_2-C_4$alkanoylamino $R_2$, $R_3$ and $R_4$ and a possible substituent of the radical $R_7$ is, in particular, acetylamino or propionylamino, preferably acetylamino.

Hal is preferably chlorine or, in particular, bromine.

The leaving group Y is, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$-C$_4$alkyl or —OSO$_2$—N (C$_1$-C$_4$alkyl)$_2$. Preferably, Y is a group of the formula —Cl, —OSO$_3$H, —SSO$_3$H, —OCO—CH$_3$, —OCO—C$_6$H$_5$ or —OPO$_3$H$_2$, in particular —Cl, —OSO$_3$H or —OCO—CH$_3$, and particularly preferably —Cl or —OSO$_3$H. Y is especially preferably a group of the formula —OSO$_3$H.

$R_2$ is preferably hydrogen, $C_1-C_4$alkyl, $C_1-C_4$alkoxy, $C_2-C_4$alkanoylamino or sulfo.

$R_3$ and $R_4$ are preferably independently of one another hydrogen, $C_1-C_4$alkyl, $C_1-C_4$alkoxy or halogen, in particular hydrogen.

$R_5$ is preferably hydroxyl.

$R_6$ is preferably methyl.

$X_1$ is preferably chlorine.

$R_7$ is preferably hydrogen or phenyl which is unsubstituted or substituted by $C_1-C_4$alkyl, $C_1-C_4$alkoxy, halogen, sulfo, β-hydroxyethylsulfonyl or a radical of the formula —SO$_2$Z. $R_7$ is particularly preferably hydrogen or phenyl which is unsubstituted or substituted by halogen, sulfo, β-hydroxyethylsulfonyl or a radical of the formula —SO$_2$Z. $R_7$ is especially preferably hydrogen or phenyl which is unsubstituted or substituted by halogen or sulfo. The corresponding phenyl radicals, in particular unsubstituted phenyl, are of particular interest here.

The reactive dyes of the formula (1) preferably contain one or two sulfo groups, in particular one sulfo group.

Preferred reactive dyes of the formula (1) are those in which $R_1$ is hydrogen or $C_1-C_4$alkyl, in particular hydrogen, $R_3$ and $R_4$ are hydrogen, $X_1$ is chlorine, Y is —Cl or —OSO$_3$H and Hal is chlorine or bromine, in particular bromine.

The radicals —(CH$_2$)$_{2-3}$— contained in the formulae (2a) to (2c) are preferably those of the formula —(CH$_2$)$_2$—.

Preferred radicals $V_1$ are those of the formulae (2c), (2d) or (2e), in particular those of the formulae (2d) or (2e), and preferably those of the formula (2d).

Preferred radicals D are those of the formula (3), and in particular those of the formula (5).

Particularly preferred reactive dyes containing a radical D of the formula (3) are those of the formula (6a)

in which $R_2$ is hydrogen, $C_1-C_4$alkyl, $C_1-C_4$alkoxy, $C_2-C_4$alkanoylamino, ureido or halogen, in particular hydrogen, $X_1$ is fluorine or chlorine and $V_1$ is as defined and preferred above.

Especially preferred reactive dyes containing a radical D of the formula (3) are those of the formula (6b)

in which $R_2$ is hydrogen, $C_1-C_4$alkyl, $C_1-C_4$alkoxy, $C_2-C_4$alkanoylamino, ureido or halogen, in particular hydrogen, and $V_1$ is as defined and preferred above.

Especially important reactive dyes containing a radical D of the formula (3) are those of the formula (6c)

in which $R_2$ is hydrogen, $C_1-C_4$alkyl, $C_1-C_4$alkoxy, $C_2-C_4$alkanoylamino, ureido or halogen, in particular hydrogen, and $V_1$ is as defined and preferred above.

The reactive dyes of the formulae (6a), (6b) and (6c) preferably contain two or three, in particular two, sulfo groups.

Particularly preferred reactive dyes containing a radical D of the formula (4) are those of the formula

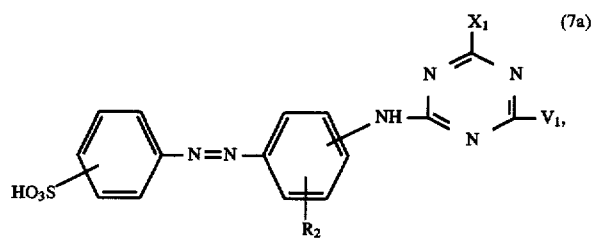

in which $R_2$ is hydrogen, $C_1$–$C_4$alkyl, $C_1$–$C_4$alkoxy, $C_2$–$C_4$alkanoylamino, ureido or halogen, preferably $C_1$–$C_4$alkyl, $C_1$–$C_4$alkoxy, $C_2$–$C_4$alkanoylamino, ureido or halogen, and in particular $C_2$–$C_4$alkanoylamino, $X_1$ is fluorine or, in particular, chlorine and $V_1$ is as defined and preferred above.

Especially preferred reactive dyes containing a radical D of the formula (4) are those of the formula

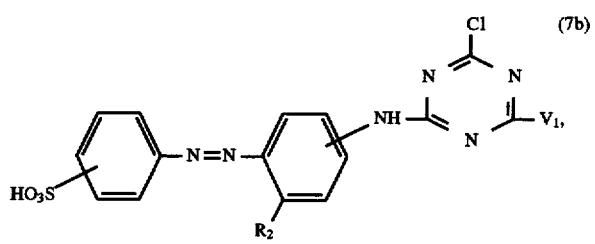

in which $R_2$ is hydrogen, $C_1$–$C_4$alkyl, $C_1$–$C_4$alkoxy, $C_2$–$C_4$alkanoylamino, ureido or halogen, preferably $C_1$–$C_4$alkyl, $C_1$–$C_4$alkoxy, $C_2$–$C_4$alkanoylamino, ureido or halogen, and in particular $C_2$–$C_4$alkanoylamino, and $V_1$ is as defined and preferred above.

Especially important reactive dyes containing a radical D of the formula (4) are those of the formula

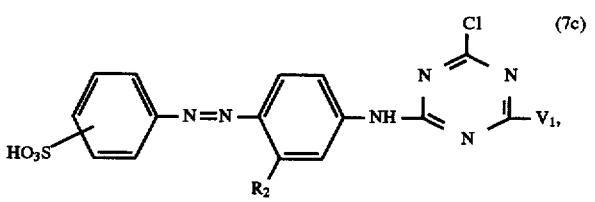

in which $R_2$ is hydrogen, $C_1$–$C_4$alkyl, $C_1$–$C_4$alkoxy, $C_2$–$C_4$alkanoylamino, ureido or halogen, preferably $C_1$–$C_4$alkyl, $C_1$–$C_4$alkoxy, $C_2$–$C_4$alkanoylamino, ureido or halogen, and in particular $C_2$–$C_4$alkanoylamino, and $V_1$ is as defined and preferred above.

The sulfo group contained in the phenyl ring of the dyes of the formulae (7a) to (7c) is preferably bonded in the 4- or, in particular, in the 3-position relative to the azo bridge.

The reactive dyes of the formulae (7a), (7b) and (7c) preferably contain one or two, in particular only one, sulfo group.

Particularly preferred reactive dyes containing a radical D of the formula (5) are those of the formula

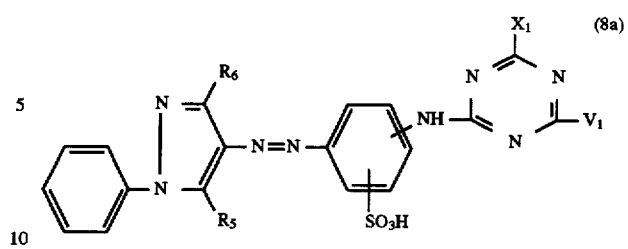

in which $R_5$ is amino or, in particular, hydroxyl, $R_6$ is carboxyl or, in particular, methyl, $X_1$ is fluorine or, in particular, chlorine and $V_1$ is a radical of the formula (2a), (2b), (2c) or (2e), in particular a radical of the formula (2b), (2c) or (2e), and preferably a radical of the formula (2b) or (2e).

Especially preferred reactive dyes containing a radical D of the formula (5) are those of the formula

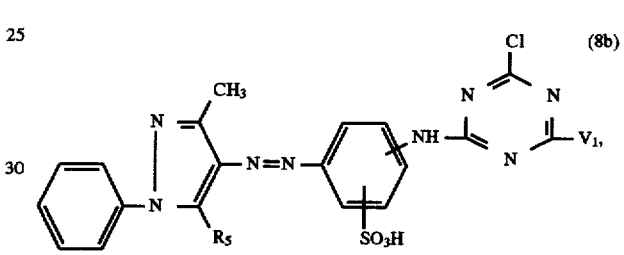

in which $R_5$ is amino or, in particular, hydroxyl and $V_1$ is a radical of the formula (2a), (2b), (2c) or (2e), in particular a radical of the formula (2b), (2c) or (2e), and preferably a radical of the formula (2b) or (2e).

Especially important reactive dyes containing a radical D of the formula (5) are those of the formula

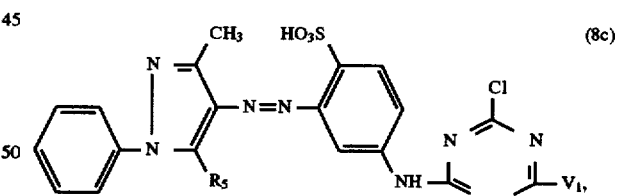

$R_5$ is amino or, in particular, hydroxyl and $V_1$ is a radical of the formula (2a), (2b), (2c) or (2e), in particular a radical of the formula (2b), (2c) or (2e), and preferably a radical of the formula (2b) or (2e).

The reactive dyes of the formulae (8a), (8b) and (8c) preferably contain one or two, in particular two, sulfo groups.

Particularly preferred reactive dyes containing a radical D of the formula (5) are furthermore those of the formula

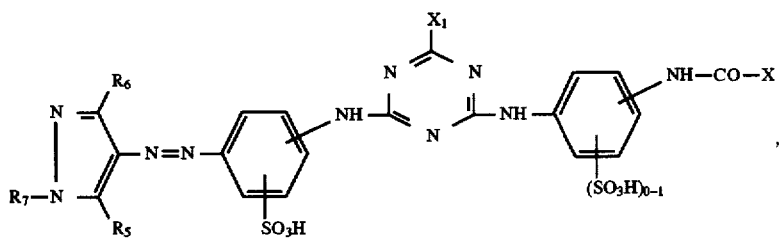

(8d)

in which $R_5$, $R_6$, $R_7$, $X_1$ and X are as defined and preferred above, and where the reactive dyes of the formula (8d) contain only one or two sulfo groups, in particular two sulfo groups.

Especially preferred reactive dyes containing a radical D of the formula (5) are furthermore those of the formula

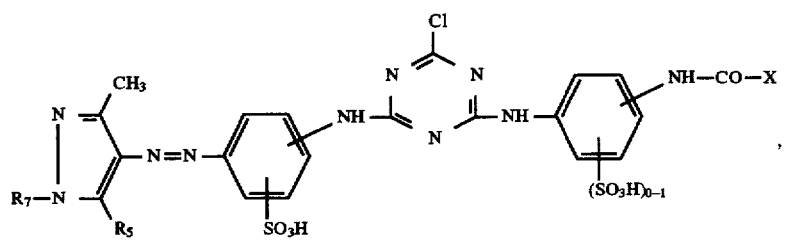

(8e)

in which $R_5$, $R_7$ and X are as defined and preferred above, and where the reactive dyes of the formula (8e) contain only one or two sulfo groups, in particular two sulfo groups.

Especially important reactive dyes containing a radical D of the formula (5) are those of the formula

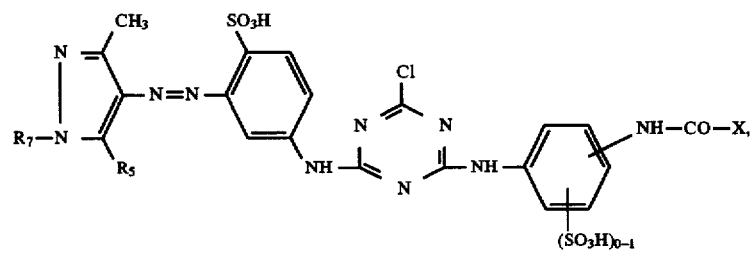

(8f)

in which $R_5$, $R_7$ and X are as defined and preferred above, and where the reactive dyes of the formula (8f) contain only one or two sulfo groups, in particular two sulfo groups.

The present invention furthermore relates to a process for the preparation of the reactive dyes of the formula (1), which comprises reacting compounds of the formulae

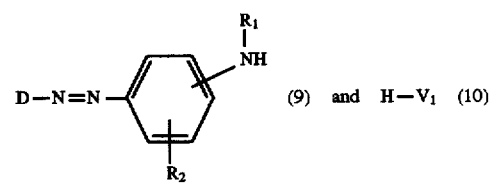

(9) and H—$V_1$ (10)

with cyanuric chloride or cyanuric fluoride and, if appropriate, subsequently carrying out a conversion reaction, where $R_1$, $R_2$ and $V_1$ are as defined above under formula (1).

Since the individual abovementioned process steps can be carried out in various sequences, and if appropriate also simultaneously, various process variants are possible. In general, the reaction is carried out stepwise, the sequence of the simple reactions between the individual reaction components advantageously depending on the particular conditions. Thus, for example, a compound of the formula (9) is reacted with cyanuric chloride or cyanuric fluoride and the resulting product is then subjected to a condensation reaction with a compound of the formula (10). Furthermore, for example, a compound of the formula (10) can be reacted with cyanuric chloride or cyanuric fluoride and the resulting product can then be subjected to a condensation reaction with a compound of the formula (9).

The individual condensation reactions are carried out, for example, by processes which are known per se, as a rule in aqueous solution, at a temperature of, for example, 0° to 50° C., in particular 0° to 10° C., and a pH of, for example, 3 to 10, in particular 3 to 7.

Furthermore, after the synthesis, conversion reactions, for example an elimination reaction, can be carried out. For example, reactive dyes of the formula (1) which contain sulfatoethylsulfonyl radicals or α,β-dihalogenopropionylamino radicals can be treated with a base, for example sodium hydroxide, the sulfatoethylsulfonyl radicals being converted into vinylsulfonyl radicals and the α,β-dihalogenopropionylamino radicals being converted into α-halogenoacryloylamino radicals.

The compounds of the formulae (9) and (10) are known or can be prepared analogously to known compounds.

The reactive dyes of the formula (1) according to the invention exist either in the form of their free acids or, preferably, as salts thereof. Salts are, for example, the alkali metal, alkaline earth metal or ammonium salts or the salts of an organic amine. Examples are the sodium, lithium, potassium or ammonium salts or the salt of mono-, di- or triethanolamine.

The reactive dyes according to the invention are suitable for dyeing and printing widely varying materials, such as fibre materials containing hydroxyl groups or containing nitrogen. Examples are silk, leather, wool, polyamide fibres and polyurethanes, and all types of cellulosic fibre materials. Such cellulosic fibre materials are, for example, the natural cellulosic fibres, such as cotton, linen and hemp, as well as cellulose and regenerated cellulose.

Dyeing or printing of natural polyamide fibre materials, for example wool, and also of synthetic polyamide fibre materials, for example polyamide 6 or polyamide 6,6, is preferred. The reactive dyes according to the invention are furthermore suitable for dyeing or printing blend fabrics or yarns of wool and synthetic polyamide. Dyeing or printing of natural polyamide fibre materials, in particular wool, is particularly preferred.

The textile material mentioned can exist in widely varying processing forms, for example as fibre, yarn, woven fabric or knitted fabric and, in particular, in the form of carpets.

The reactive dyes according to the invention can be applied in a tinctorially effective amount to the fibre material and fixed on the fibre in various ways, in particular in the form of aqueous dye solutions and printing pastes, dyeing, in particular by the exhaust method, being preferred.

The reactive dyes according to the invention are distinguished by a high reactivity, good fixing capacity and good exhaustion properties. The reactive dyes according to the invention are also particularly suitable for printing, in particular for printing nitrogen-containing fibres. The reactive dyes according to the invention furthermore can readily be combined with other dyes.

The dyeings and prints produced with the reactive dyes according to the invention have a good fastness to light and very good wet fastness properties, such as fastnesses to washing, water, seawater, cross-dyeing and perspiration. Dyeings which are level over the fibre and over the surface are obtained.

In the following examples, parts are parts by weight. The temperatures are degrees Celsius. Parts by weight bear the same relation to parts by volume as the gram to the cubic centimeter.

EXAMPLE 1 a) 10 parts of a compound which, in the form of the free acid, has the formula

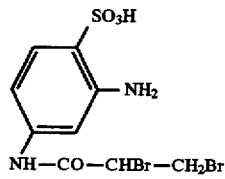

(101)

are stirred in 100 parts of water, the pH is brought to 6 by addition of 0.35 part of $Na_2HPO_4 \cdot 12H_2O$ and the mixture is cooled to a temperature of 0° C. A solution of 4.85 parts of cyanuric chloride and 50 parts of acetone is now added dropwise to the resulting suspension in the course of 10 to 15 minutes, the pH being kept at a value of 3 by addition of aqueous sodium hydroxide solution. The mixture is subsequently stirred at a temperature of 0° to 2° C. and a pH of 3 for 1 hour. After addition of sodium chloride, the mixture is subsequently stirred for a further hour and the resulting product is filtered off, rinsed with 10% aqueous sodium chloride solution and pressed off. A moist press-cake which comprises the compound, shown in the form of the free acid, of the formula

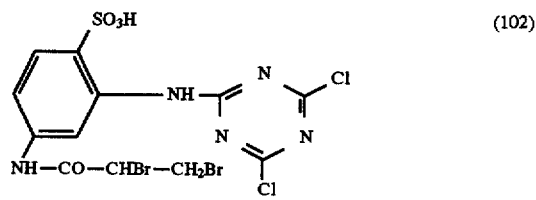

(102)

is obtained.

b) 8.8 parts of a compound which, in the form of the free acid, has the formula

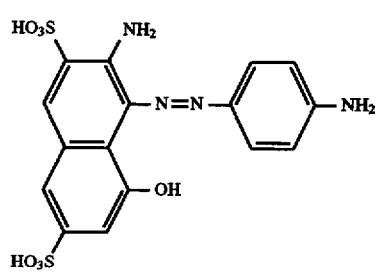

(103)

are dissolved in 100 parts of water and 11.1 parts of 1 normal sodium hydroxide solution at room temperature and a pH of 5.5. This solution is subsequently added dropwise to a cold suspension, at 0° to 5° C., comprising 60 parts of the moist press-cake obtainable according to a) in 100 parts of ice-water in the course of 45 minutes. During the addition, the pH is kept at a value of 5.8 to 6 by addition of aqueous sodium bicarbonate solution. The mixture is subsequently stirred at room temperature and a pH of 5.8 to 6 for 90 minutes. The dye is then filtered off, rinsed with 10% aqueous sodium chloride solution and dried at a temperature of 30° to 35° C. A dye which, in the form of the free acid, is the compound of the formula

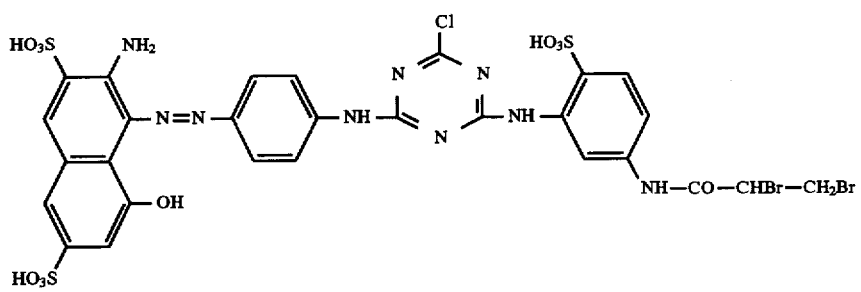
(104)

is obtained. The dye of the formula (104) dyes wool and synthetic polyamide fibre material in red colour shades.

EXAMPLES 2 to 11

The dyes shown in the form of the free acid in column 2 in the following Table 1, which dye wool and synthetic polyamide fibre material in the colour shades shown in column 3, can be obtained in an analogous manner to the instructions in Example 1. If the dyes shown in the following table contain no radical of the formula —NH—CO—CHBr—CH$_2$Br or —CO—NH—(CH$_2$)$_2$—SO$_2$—CH$_2$CH$_2$Cl, the first condensation reaction is carried out at a pH of about 6 and a temperature of about 10° to 30° C.

TABLE 1

| Example | Dye | Colour shade on wool and polyamide |
|---|---|---|
| 2 | (structure) | red |
| 3 | (structure) | red |
| 4 | (structure) | red |

TABLE 1-continued

| Example | Dye | Colour shade on wool and polyamide |
|---|---|---|
| 5 | [structure: 3-sulfophenyl-N=N-(2-NHCOCH₃)phenyl-NH-triazine(Cl)-NH-phenyl-SO₂-CH₂CH₂-OSO₃H] | yellow |
| 6 | [structure: 3-sulfophenyl-N=N-(2-NHCOCH₃)phenyl-NH-triazine(Cl)-NH-(2-SO₃H)phenyl-NH-CO-CHBr-CH₂Br] | yellow |
| 7 | [structure: 3-sulfophenyl-N=N-(2-NHCONH₂)phenyl-NH-triazine(Cl)-NH-(2-SO₃H)phenyl-NH-CO-CHBr-CH₂Br] | yellow |
| 8 | [structure: 3-sulfophenyl-N=N-(2-NHCOCH₂CH₃)phenyl-NH-triazine(Cl)-NH-(2-SO₃H)phenyl-NH-CO-CHBr-CH₂Br] | yellow |
| 9 | [structure: 3-sulfophenyl-N=N-(2-CH₃)phenyl-NH-triazine(Cl)-NH-(2-SO₃H)phenyl-NH-CO-CHBr-CH₂Br] | yellow |
| 10 | [structure: 4-sulfophenyl-N=N-(2-NHCOCH₃)phenyl-NH-triazine(Cl)-NH-(2-SO₃H)phenyl-NH-CO-CHBr-CH₂Br] | yellow |
| 11 | [structure: triazine(Cl)(NH-(CH₂)₂-O-(CH₂)₂-SO₂-CH₂CH₂Cl)-NH-phenyl(SO₃H)-N=N-pyrazolone(CH₃, OH, N-phenyl)] | yellow |

EXAMPLE 12 a) 3.7 parts of cyanuric chloride are suspended in a mixture of 18 parts of water, 38 parts of ice and 0.02 parts of $Na_2HPO_4.12H_2O$ at a temperature of 0° to 2° C. in the course of 15 minutes. A solution of 8.8 parts of the compound of the formula (103), 100 parts of water and 11.5 parts of a 1 normal aqueous sodium hydroxide solution is added dropwise to the resulting suspension in the course of 30 minutes, the pH being kept at a value of 3 by addition of aqueous sodium hydroxide solution. The mixture is subsequently stirred at a temperature of 0° to 2° C. and a pH of 3 for 1 hour. A solution which comprises the compound, shown in the form of the free acid, of the formula

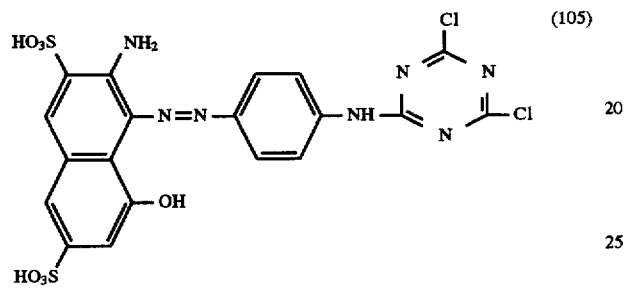
(105)

is obtained.

b) 9.7 parts of a compound which, in the form of the free acid, has the formula

(106)

are dissolved in 20 parts of water and 60 parts of acetone at room temperature. The solution thus obtained is added dropwise to the solution obtained according to a), which has been cooled to a temperature of 0° to 5° C., in the course of 1 hour. During the addition, the pH is kept at a value of 5.8 to 6 by means of aqueous 10% sodium bicarbonate solution. The mixture is subsequently stirred at room temperature and a pH of 5.8 to 6 overnight. After addition of potassium chloride, the mixture is stirred for 30 minutes and the dye is filtered off, washed with aqueous potassium chloride solution and dried at a temperature of 30° to 35° C. A dye which, in the form of the free acid, is the compound of the formula is obtained. The dye of the formula (107) dyes wool and synthetic polyamide fibre material in red colour shades.

EXAMPLES 13 to 22

The dyes shown in the form of the free acid in column 2 in the following Table 2, which dye wool and synthetic polyamide fibre material in the colour shades shown in column 3, can be obtained in an analogous manner to the instructions in Example 12.

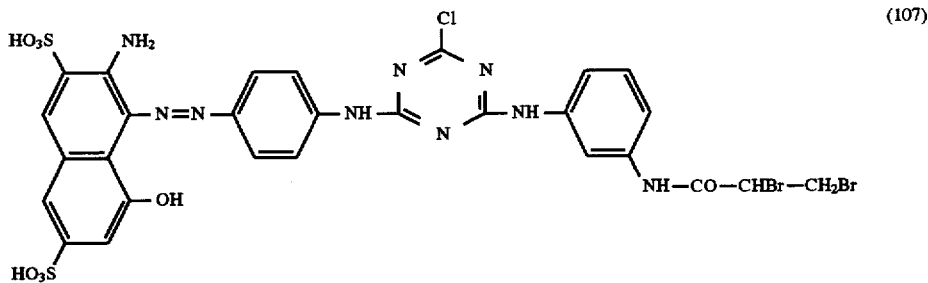
(107)

TABLE 2
| Example Dye | | Colour shade on wool and polyamide |
|---|---|---|
| 13 | 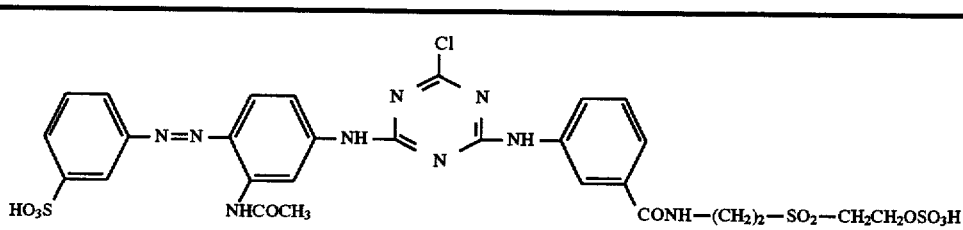 | yellow |
| 14 | 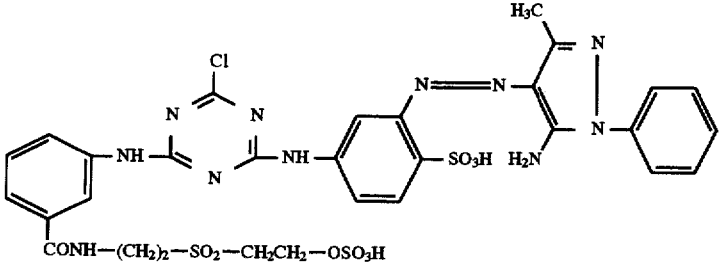 | yellow |
| 15 | 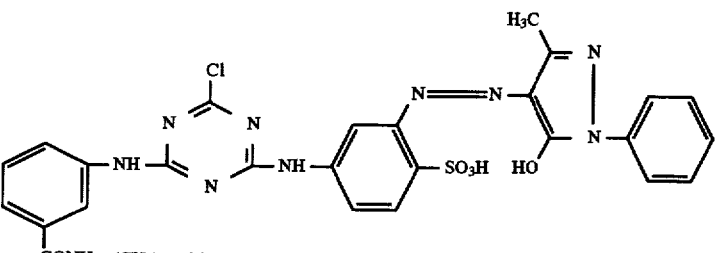 | yellow |
| 16 | 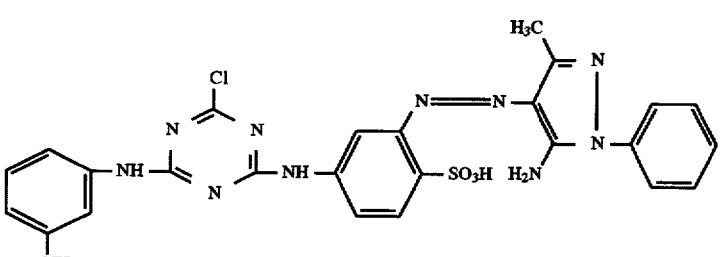 | yellow |
| 17 | 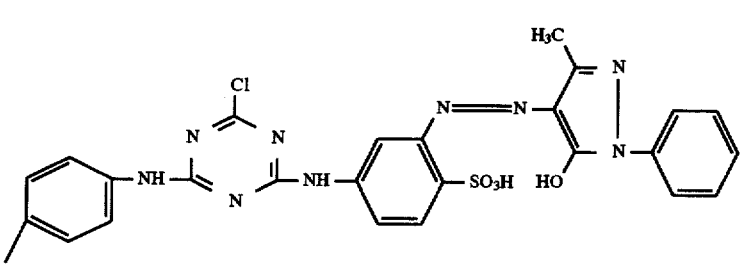 | yellow |

TABLE 2-continued

| Example | Dye | Colour shade on wool and polyamide |
|---|---|---|
| 18 | (structure: chlorotriazine linked via NH to phenylene-NH-CO-CHBr-CH₂Br on one side and via NH to azo-coupled phenyl-SO₃H, coupled to pyrazolone-type system with H₃C, HO, N, and 2,5-dichloro-4-sulfophenyl group) | yellow |
| 19 | (structure: chlorotriazine with m-(NH-CO-CHBr-CH₂Br)phenylamino group, NH-linked to phenyl-SO₃H azo-coupled to H₃C-C=N-N system with H₂N and m-sulfophenyl-N) | yellow |
| 20 | (structure: chlorotriazine with p-(NH-CO-CHBr-CH₂Br)phenylamino group, NH-linked to phenyl-SO₃H azo-coupled to H₃C-C=N-N system with H₂N and m-sulfophenyl-N) | yellow |
| 21 | (structure: chlorotriazine with p-(NH-CO-CHBr-CH₂Br)phenylamino group, NH-linked to phenyl-SO₃H azo-coupled to pyrazolone with H₃C, HO, and 2,5-dichloro-4-sulfophenyl group) | yellow |
| 22 | (structure: chlorotriazine with m-(NH-CO-CHBr-CH₂Br)phenylamino group, NH-linked to phenyl-SO₃H azo-coupled to pyrazolone with H₃C, HO, and 4-(SO₂-CH=CH₂)phenyl group) | yellow |

EXAMPLE 23

A) 36.8 parts of cyanuric chloride are suspended in 250 parts of ice, 150 parts of water and 0.2 part of Na₂HPO₄.12H₂O at a temperature of 8° C. and a pH of about 6. A solution of 45.3 of a compound of the formula $$H_2N-(CH_2)_2-O-(CH_2)_2-SO_2-CH_2CH_2Cl \quad (108)$$

in 150 parts of water is then metered in over a period of 1.5 hours, the pH being kept at a value of 6.4 by addition of aqueous 10% sodium bicarbonate solution. The mixture is stirred at a temperature of 0° to 2° C. and a pH of 6.4 for one hour. It is subsequently stirred at a temperature of 8° to 10°

C. and a pH of 6.4 for about 4 hours. After filtration and drying, a compound of the formula

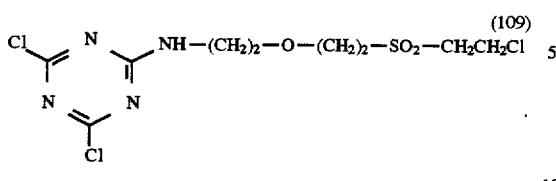
(109)

is obtained.

b) 22 parts of the compound of the formula (109) obtainable as described above under a) are suspended in 100 parts of ice-water at a temperature of 10° C. and a pH of 2.3. A solution of 10.2 parts of a compound of the formula

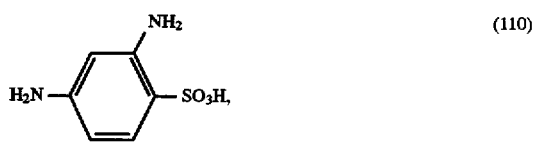
(110)

100 parts of water and 26 parts of a 2 normal aqueous sodium hydroxide solution is then added in the course of 15 minutes, the temperature being kept at 35° to 40° C. and the pH being kept at a value of about 7 by addition of aqueous 10% sodium bicarbonate solution. The reaction mixture is stirred under these conditions for 6 hours. It is brought to a pH of 1 to 1.2 by means of hydrochloric acid (16%). After addition of sodium chloride, the product is filtered off and washed with aqueous sodium chloride solution. A moist press-cake which comprises the compound, shown in the form of the free acid, of the formula

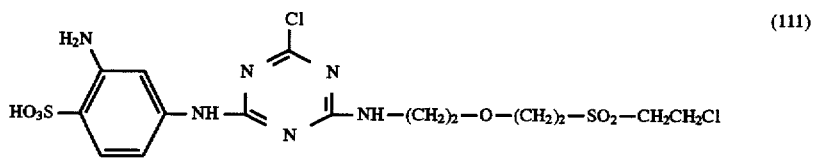
(111)

is obtained.

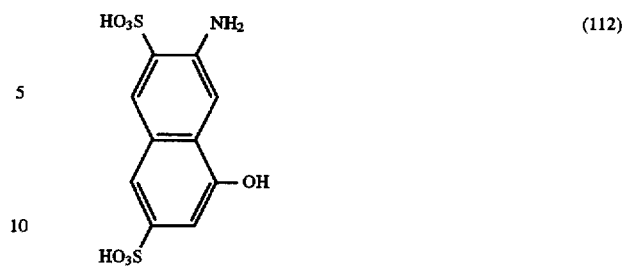
(112)

are dissolved in 50 parts of water and 3.4 parts of an aqueous 15% sodium hydroxide solution at room temperature and a pH of 7.5 to 8. A pH of 3.5 is then established with acetic acid, and the mixture is cooled to a temperature of 0° to 5° C. The diazo component suspension obtainable as described above under c) is added to the resulting suspension in the course of 30 minutes. During this, the pH is kept at a value of 3.5 by means of an aqueous saturated sodium acetate solution. The mixture is then subsequently stirred at a pH of 3.5 and a temperature of 0° to 5° C. for 2.5 hours. After addition of sodium chloride, the mixture is subsequently stirred overnight and the dye is filtered off and dried. A dye which, in the form of the free acid, is the compound of the formula

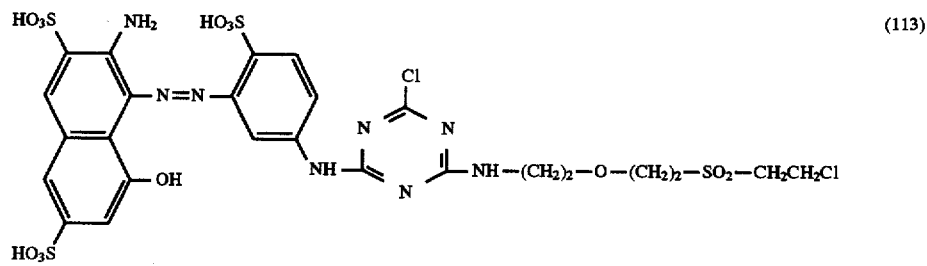
(113)

c) 17.5 parts of the moist press-cake obtainable as described above under b) are suspended in 175 parts of water at a temperature of 0° to 2° C. and the pH is brought to a value of 1 by means of hydrochloric acid (32%). Diazotization is carried out at a temperature of 5° to 10° C. in the course of 90 minutes by addition of 3.8 parts of an aqueous 4 normal sodium nitrite solution, and excess nitrite is then destroyed by addition of sulfamic acid.

d) To prepare a suspension of the coupling component, 4.9 parts of the compound of the formula is obtained. The dye of the formula (113) dyes wool and synthetic polyamide fibre material in red colour shades.

EXAMPLES 24 to 43

The dyes shown in the form of the free acid in column 2 in the following Table 3, which dye wool and synthetic polyamide fibre material in the colour shades shown in column 3, can be obtained in an analogous manner to the instructions in Example 23. In the case of the dyes contain ing a radical of the formula —NH—CO—CHBr—CH$_2$Br, the first condensation reaction is carried out at a pH of about 3 and a temperature of about 0° to 5° C. In the case of the dyes containing a radical of the formula —SO$_2$—CH$_2$CH$_2$—OSO$_3$H, the first condensation reaction is carried out at a pH of about 6 and a temperature of about 30° C.

TABLE 3

| Example | Dye | Colour shade on wool and polyamide |
|---------|-----|-----------------------------------|
| 24 | | yellow |
| 25 | | yellow |
| 26 | | yellow |
| 27 | | yellow |
| 28 | | yellow |

TABLE 3-continued

| Example | Dye | Colour shade on wool and polyamide |
|---|---|---|
| 29 | | yellow |
| 30 | | yellow |
| 31 | | yellow |
| 32 | | yellow |
| 33 | | yellow |
| 34 | | yellow |

TABLE 3-continued

| Example | Dye | Colour shade on wool and polyamide |
|---|---|---|
| 35 | [structure: 2-sulfo-4-(NHCO-CHBr-CH₂Br)phenyl-NH-triazine(Cl)-NH-phenyl(SO₃H)-N=N-C(CH₃)=C(OH)-N=N-phenyl-SO₂-CH₂CH₂-OH] | yellow |
| 36 | [structure: 3-(NHCO-CHBr-CH₂Br)phenyl-NH-triazine(Cl)-NH-phenyl(SO₃H)-N=N-C(CH₃)=C(OH)-N=N-(2-Cl,5-SO₃H)phenyl] | yellow |
| 37 | [structure: 3-(NHCO-CHBr-CH₂Br)phenyl-NH-triazine(Cl)-NH-phenyl(SO₃H)-N=N-C(CH₃)=C(OH)-N=N-phenyl-SO₂-CH₂CH₂-OSO₃H] | yellow |
| 38 | [structure: 3-(NHCO-CHBr-CH₂Br)phenyl-NH-triazine(Cl)-NH-phenyl(SO₃H)-N=N-C(CH₃)=C(OH)-N=N-(3-SO₃H)phenyl] | yellow |
| 39 | [structure: 3-(NHCO-CHBr-CH₂Br)phenyl-NH-triazine(Cl)-NH-phenyl(SO₃H)-N=N-C(CH₃)=C(NH₂)-N=N-(2-Cl,5-SO₃H)phenyl] | yellow |

TABLE 3-continued

| Example | Dye | Colour shade on wool and polyamide |
|---|---|---|
| 40 | [structure: triazine with Cl, NH-phenyl-NH-CO-CHBr-CH₂Br, linked via NH to phenyl-SO₃H with azo to pyrazolone (H₃C, HO) N-phenyl-SO₃H] | yellow |
| 41 | [structure: triazine with Cl, NH-phenyl-NH-CO-CHBr-CH₂Br, linked via NH to phenyl-SO₃H with azo to pyrazolone (H₃C, HO) NH] | yellow |
| 42 | [structure: triazine with Cl, NH-phenyl-NH-CO-CHBr-CH₂Br, linked via NH to phenyl-SO₃H with azo to pyrazolone (H₃C, HO) N-(2-chlorophenyl)] | yellow |
| 43 | [structure: triazine with Cl, NH-phenyl-NH-CO-CHBr-CH₂Br, linked via NH to phenyl-SO₃H with azo to pyrazolone (H₃C, HO) N-phenyl-SO₂-CH₂CH₂-OH] | yellow |

EXAMPLE 44

9.8 parts of the dye obtainable according to Example 1 are stirred in 100 parts of water at a temperature of 60° to 70° C. The pH is kept at a value of 7 by addition of an aqueous 1 normal sodium hydroxide solution and acrylation is carried out under these conditions for a total of 135 minutes. The mixture is then cooled to room temperature and subsequently stirred for 30 minutes, after addition of potassium chloride, and the resulting dye is filtered off, rinsed with 100 parts of an aqueous potassium chloride solution and dried at a temperature of 30° C. A dye which, in the form of the free acid, is the compound of the formula

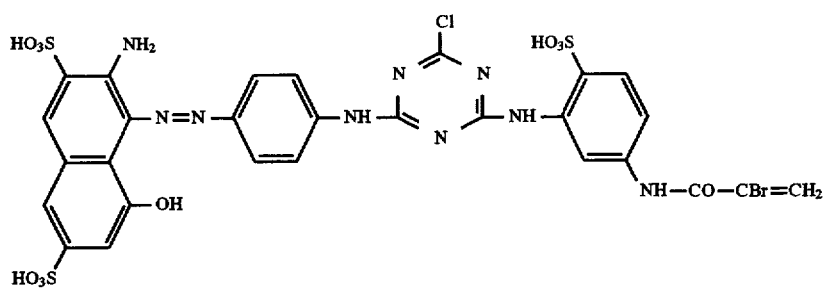
(114)

is obtained. The dye of the formula (114) dyes wool and synthetic polyamide fibre material in yellow colour shades.

EXAMPLES 45 to 80

The dyes shown in the form of the free acid in column 2 in the following Table 4, which dye wool and synthetic polyamide fibre material in the colour shades shown in column 3, can be obtained in an analogous manner to the instructions in Example 44. If the dyes contain no radical of the formula —NH—CO—CBr=$CH_2$, the vinylation is carried out at a pH of about 8 to 10 and a temperature of about 25° C.

TABLE 4

| Example | Dye | Colour shade on wool and polyamide |
|---------|-----|-------------------------------------|
| 45 | | red |
| 46 | | red |
| 47 | | red |

TABLE 4-continued
| Example | Dye | Colour shade on wool and polyamide |
|---|---|---|
| 48 | 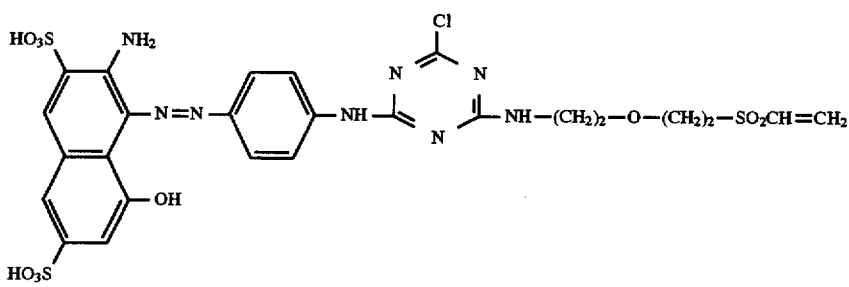 | red |
| 49 | 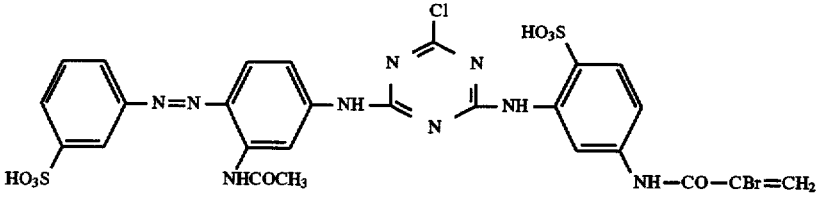 | yellow |
| 50 | 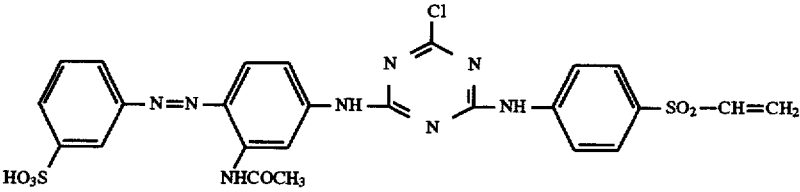 | yellow |
| 51 | 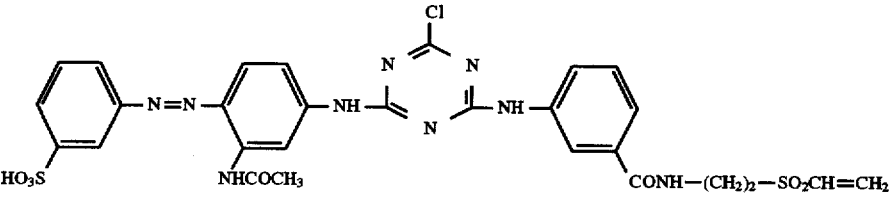 | yellow |
| 52 | 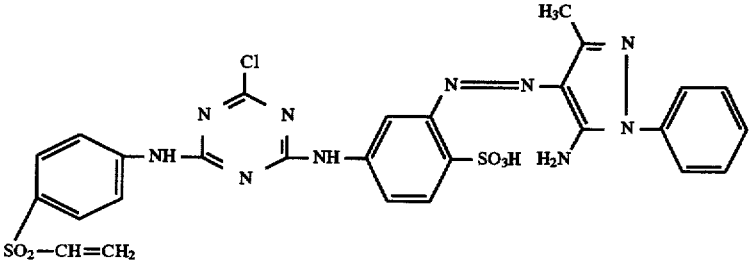 | yellow |
| 53 | 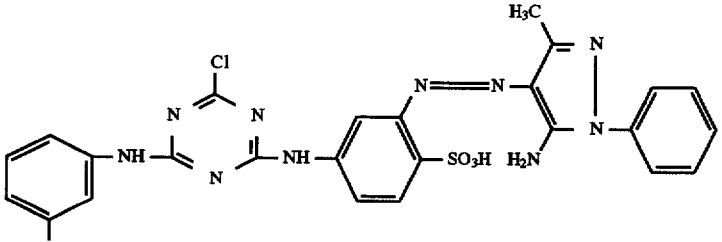 | yellow |

TABLE 4-continued

| Example | Dye | Colour shade on wool and polyamide |
|---|---|---|
| 54 | | yellow |
| 55 | | yellow |
| 56 | | yellow |
| 57 | | yellow |
| 58 | | yellow |

TABLE 4-continued

| Example | Dye | Colour shade on wool and polyamide |
|---|---|---|
| 59 | | yellow |
| 60 | | yellow |
| 61 | | yellow |
| 62 | | yellow |
| 63 | | yellow |

TABLE 4-continued

| Example | Dye | Colour shade on wool and polyamide |
|---|---|---|
| 64 | (structure) | yellow |
| 65 | (structure) | yellow |
| 66 | (structure) | yellow |
| 67 | (structure) | yellow |
| 68 | (structure) | yellow |

TABLE 4-continued

| Example | Dye | Colour shade on wool and polyamide |
|---|---|---|
| 69 | (structure) | yellow |
| 70 | (structure) | yellow |
| 71 | (structure) | yellow |
| 72 | (structure) | yellow |
| 73 | (structure) | yellow |

TABLE 4-continued
| Example | Dye | Colour shade on wool and polyamide |
|---|---|---|
| 74 | 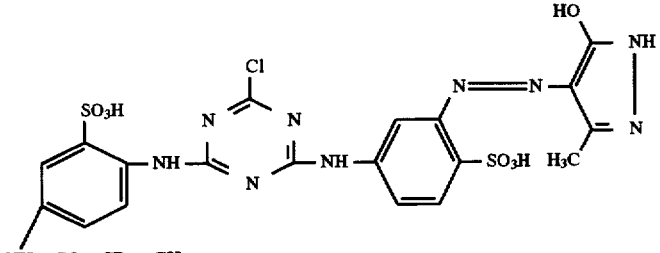 | yellow |
| 75 | 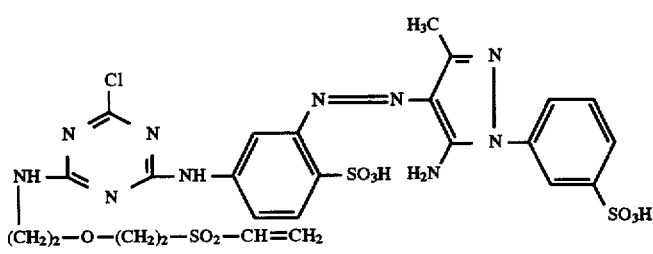 | yellow |
| 76 | 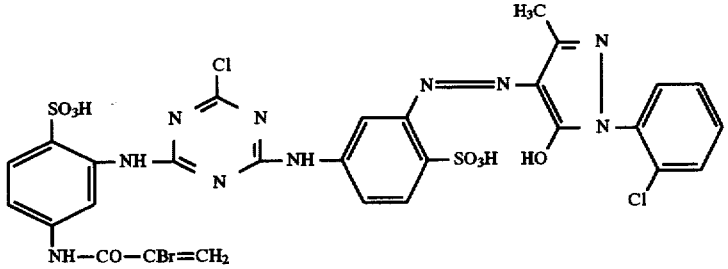 | yellow |
| 77 | 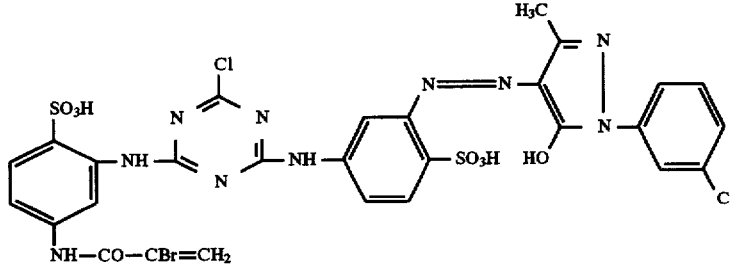 | yellow |
| 78 | 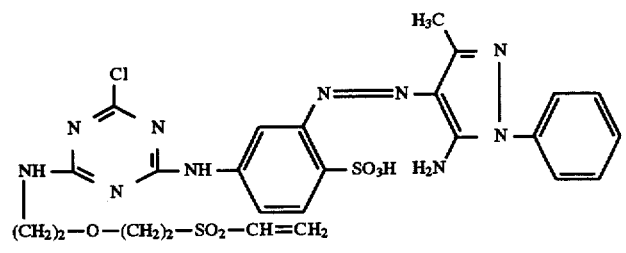 | yellow |
| 78 | 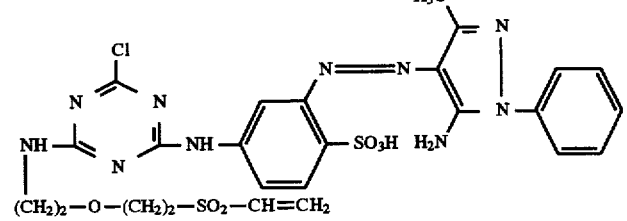 | yellow |

TABLE 4-continued

| Example | Dye | Colour shade on wool and polyamide |
|---|---|---|
| 79 | 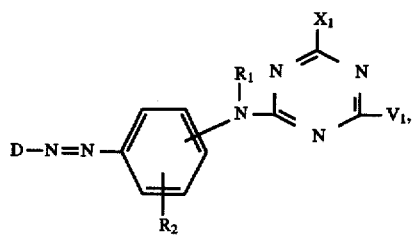 | yellow |
| 80 | | yellow |

Dyeing instructions 0.1 part of the dye according to Example 1 is dissolved in 200 parts of water, and 0.5 part of sodium sulfate, 0.1 part of a levelling assistant (based on the condensation product of a higher aliphatic amine and ethylene oxide) and 0.5 part of sodium acetate are added. The pH is then brought to a value of 5.5 with acetic acid (80%). The dyebath is heated at 50° C. for 10 minutes and 10 parts of a woollen fabric are then added. The bath is heated to a temperature of 100° C. in the course of about 50 minutes and dyeing is carried out at this temperature for 60 minutes. Thereafter, the bath is allowed to cool to 90° C. and the dyed goods are removed. The woollen fabric is washed with hot and cold water and then spun and dried. A red dyeing which has good light and wet fastness properties and a good levelness is obtained.

What is claimed is:

1. A reactive dye of the formula (1)

in which $R_1$ is hydrogen or substituted or unsubstituted $C_1-C_4$alkyl, $R_2$ is hydrogen, $C_1-C_4$alkyl, $C_1-C_4$alkoxy, $C_2-C_4$alkanoylamino, ureido, halogen or sulfo, $X_1$ is fluorine or chlorine, $V_1$ is a radical of the formula

 (2a)

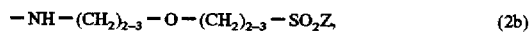 (2b)

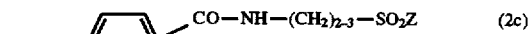 (2c)

 (2d)

in which

Z is the radical —CH=CH$_2$ or —CH$_2$—CH$_2$—Y and

Y is a leaving group,

X is the radical

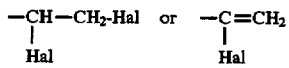

and

Hal is halogen, and

D is a radical of the formula

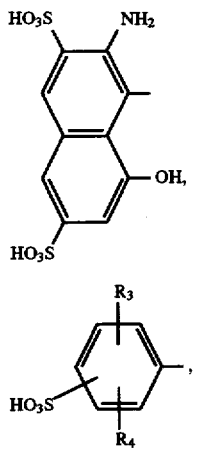

in which R₃ and R₄ independently of one another are hydrogen, $C_1$-$C_4$alkyl, $C_1$-$C_4$alkoxy, $C_2$-$C_4$alkanoylamino, ureido or halogen, or

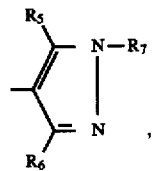

in which

R₅ is hydroxyl or amino,

R₆ is methyl or carboxyl and

R₇ is hydrogen or phenyl which is unsubstituted or substituted by $C_1$-$C_4$alkyl, $C_1$-$C_4$alkoxy, $C_2$-$C_4$alkanoylamino, ureido, halogen, sulfo, β-hydroxyethylsulfonyl or a radical of the formula —SO₂Z, in which Z is as defined above, with the proviso that, if V₁ is a radical of the formula (2a) and D is a radical of the formula (3), R₂ is not sulfo, and if V₁ is a radical of the formula (2a), (2b), or (2c) and D is a radical of the formula (5), R₇ is hydrogen or unsubstituted phenyl, and if V₁ is a radical of the formula (2d) and D is a radical of the formula (5), the reactive dye of the formula (1) contains not more than two sulfo groups.

2. A reactive dye according to claim 1, in which R₁ is hydrogen or $C_1$-$C_4$alkyl which is unsubstituted or substituted by hydroxyl, sulfo or sulfato.

3. A reactive dye according to claim 1, in which R₁ is hydrogen or $C_1$-$C_4$alkyl.

4. A reactive dye according to claim 1, in which R₃ and R₄ are hydrogen.

5. A reactive dye according to claim 1, in which X₁ is chlorine.

6. A reactive dye according to claim 1, in which Y is —Cl or —OSO₃H.

7. A reactive dye according to claim 1, of the formula

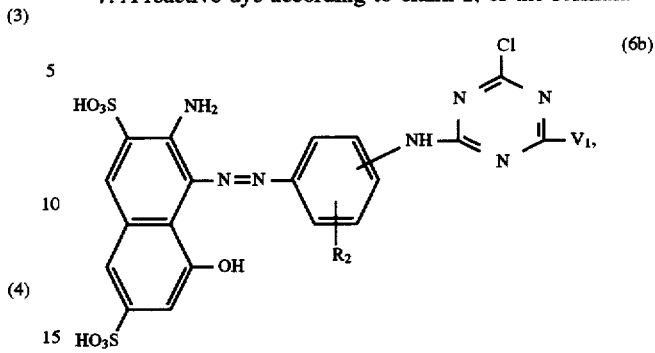

in which

R₂ is hydrogen, $C_1$-$C_4$alkyl, $C_1$-$C_4$alkoxy, $C_2$-$C_4$alkanoylamino, ureido or halogen, and V₁ is as defined in claim 1.

8. A reactive dye according to claim 1, of the formula

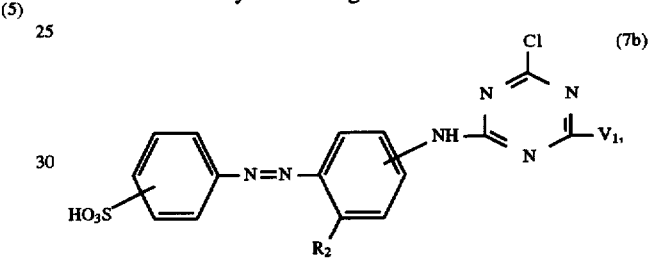

in which

R₂ is $C_1$-$C_4$alkyl, $C_1$-$C_4$alkoxy, $C_2$-$C_4$alkanoylamino, ureido or halogen, and V₁ is as defined in claim 1.

9. A reactive dye according to claim 1, of the formula

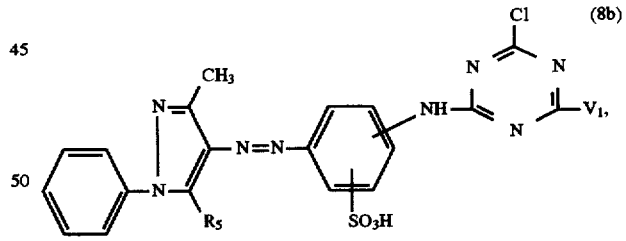

in which

R₅ is as defined in claim 1 and

V₁ is a radical of the formula (2a), (2b), (2c) or (2c).

10. A reactive dye according to claim 1, of the formula

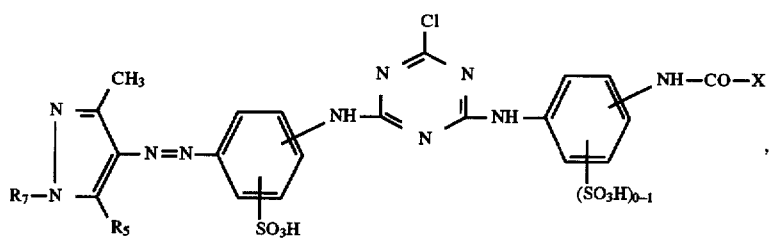

(8e)

in which

R$_5$, R$_7$ and X are as defined in claim 1, which contains only one or two sulfo groups.

11. A reactive dye according to claim 1, in which V$_1$ is a radical of the formula (2c), or (2d).

12. A reactive dye according to claim 1, in which V$_1$ is a radical of the formula (2d).

13. A reactive dye of the formula

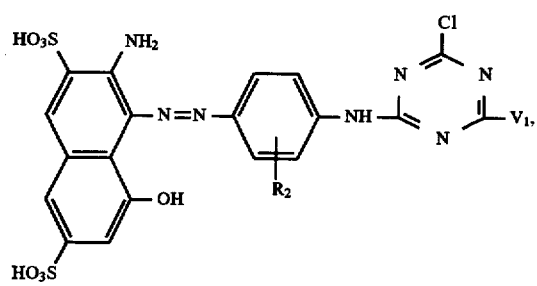

(6c)

in which

R$_2$ is hydrogen, C$_1$-C$_4$alkyl, C$_1$-C$_4$alkoxy, C$_2$-C$_4$alkanoylamino, ureido or halogen, and V$_1$ is a radical of the formula

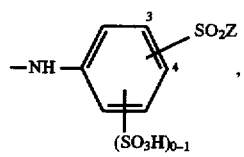

(2e)

in which

Z is the radical —CH=CH$_2$ or —CH$_2$—CH$_2$—Y and Y is a leaving group, the radical —SO$_2$Z in formula (2e) is bonded in the 3- or 4-position shown and wherein the dye of formula (6c) contains not more than two sulfo groups.

14. A reactive dye of the formula (8c)

in which

R$_5$ is amino or hydroxyl and

V$_1$ is a radical of the formula (2e)

in which

Z is the radical —CH=CH$_2$ or —CH$_2$—CH$_2$—Y and Y is a leaving group, the radical —SO$_2$Z in formula (2e) is bonded in the 3- or 4-position shown and wherein the dye of formula (8c) contains not more than one sulfo group.

15. A process for the preparation of a reactive dye according to claim 1, which comprises reacting compounds of the formulae

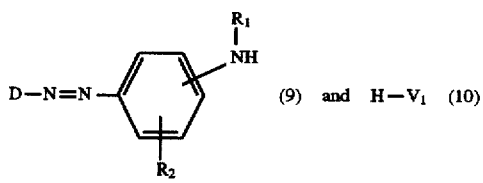

(9) and H—V$_1$ (10)

with cyanuric chloride or cyanuric fluoride where R$_1$, R$_2$ and V$_1$ are as defined in claim 1.

16. A process for dyeing or printing fibre material containing hydroxyl groups or containing nitrogen, which process comprises the step of applying to said fibre material a tinctorially effective amount of a reactive dye according to claim 1.

17. A process according to claim 16 wherein said fibre material is natural or synthetic polyamide fibre material.

18. A reactive dye according to claim 1, in which Hal is chlorine or bromine.

* * * * *